United States Patent
Choi et al.

(10) Patent No.: US 7,460,204 B2
(45) Date of Patent: Dec. 2, 2008

(54) LIQUID CRYSTAL DISPLAY DEVICE AND MANUFACTURING METHOD THEREOF

(75) Inventors: Kee Seok Choi, Gumi-si (KR); Sung Hak Jo, Seoul (KR)

(73) Assignee: LG Display Co., Ltd., Seoul (KR)

( * ) Notice: Subject to any disclaimer, the term of this patent is extended or adjusted under 35 U.S.C. 154(b) by 230 days.

(21) Appl. No.: 11/166,196

(22) Filed: Jun. 27, 2005

(65) Prior Publication Data
US 2006/0001825 A1    Jan. 5, 2006

(30) Foreign Application Priority Data
Jun. 30, 2004    (KR) .................. 10-2004-0050548

(51) Int. Cl.
*G02F 1/1339* (2006.01)
(52) U.S. Cl. ............... 349/156; 349/43; 349/106
(58) Field of Classification Search ............ 349/155, 349/43, 156
See application file for complete search history.

(56) References Cited

U.S. PATENT DOCUMENTS

| | | | | |
|---|---|---|---|---|
| 6,031,512 A | * | 2/2000 | Kadota et al. | 345/88 |
| 6,249,330 B1 | * | 6/2001 | Yamaji et al. | 349/122 |
| 6,433,852 B1 | * | 8/2002 | Sonoda et al. | 349/156 |
| 6,888,608 B2 | * | 5/2005 | Miyazaki et al. | 349/156 |
| 6,912,034 B2 | * | 6/2005 | Nagano et al. | 349/144 |
| 7,167,221 B2 | * | 1/2007 | Yeh et al. | 349/110 |
| 2001/0048489 A1 | * | 12/2001 | Izumi et al. | 349/43 |

FOREIGN PATENT DOCUMENTS

| CN | 1368655 | 9/2002 |
|---|---|---|
| CN | 1504819 | 6/2004 |

* cited by examiner

*Primary Examiner*—Richard H Kim
(74) *Attorney, Agent, or Firm*—McKenna Long & Aldridge LLP

(57) ABSTRACT

An LCD and method are provided in which a cell gap between substrates is maintained and an overcharge of liquid crystal is prevented. In the LCD, a first substrate includes a TFT and a color filter layer and a second substrate faces the first substrate. A column spacer is formed on the first substrate and a protrusion is formed on the second substrate at a position corresponding to the column spacer. And, a liquid crystal layer is formed between the first and second substrates.

10 Claims, 5 Drawing Sheets

LIQUID CRYSTAL DISPLAY DEVICE AND MANUFACTURING METHOD THEREOF

This application claims the benefit of Korean Patent Application No. 2004-50548, filed on Jun. 30, 2004, which is hereby incorporated by reference for all purposes as if fully set forth herein.

BACKGROUND OF THE INVENTION

1. Field of the Invention

The present invention relates to a liquid crystal display device (LCD). More particularly, the present invention relates to an LCD having an excellent image quality and a manufacturing method thereof.

2. Description of the Related Art

The cathode ray tube (CRT) has been widely used to display images. The CRT is, however, inconvenient to use because it is large and heavy for its display area.

With the development of electronic industries, a display device that has been limited to a TV display is now applicable to various fields such as personal computers, laptops, wireless terminals, car dashboards, and electronic display boards. Additionally, because the rapid development of the information and communication technology makes it possible to transmit high-capacity image information, there is an increasing demand for next-generation display devices that can process mass image information.

A liquid crystal display device (LCD) is an example of the next-generation display device because it has many advantages such as lightweight, slim profile, high brightness, large screen size, low power consumption, and low price.

The LCD has higher resolution than other flat display devices. Also, when displaying a moving picture, the LCD has a response speed comparable to the CRT.

The LCD includes two substrates facing each other, a liquid crystal layer interposed between the two substrates, and electrodes formed on the substrates. By this structure, the LCD adjusts the amount of light transmitted through the liquid crystal layer by rearranging liquid crystal molecules of the liquid crystal layer according to a voltage applied to the electrodes, thereby displaying an image.

When a gap between the two substrates becomes non-constant, light transmittances therethrough become different from one another. Thus, causing a non-uniform brightness. Accordingly, spacers are interposed between the two substrates to maintain a constant gap between the two substrates.

FIG. 1 is a plan view of a lower substrate of a related art LCD, and FIG. 2 is an enlarged sectional view taken along line I-I' in FIG. 1.

In FIGS. 1 and 2, the related art LCD includes an upper substrate 118 on which a color filter layer 112 for reproducing color is formed, a lower substrate 119 on which a thin film transistor (switching device) 121 for converting an arrangement of liquid crystal molecules is formed, and a liquid crystal layer 120 formed between the upper and lower substrates 118 and 119.

The upper substrate 118 further includes thereon a black matrix 111 for preventing light leakage, and a common electrode 113 (first electrode) for applying a voltage to the liquid crystal layer 120. The lower substrate 119 further includes thereon gate and data lines 114 and 115 perpendicularly crossing each other to define a pixel region, and a pixel electrode (second electrode) 122 for receiving a signal from the thin film transistor (TFT) 121 to apply a voltage to the liquid crystal layer 120.

A column spacer 126 is formed between the upper and lower substrates 118 and 119 to maintain a constant gap therebetween, and a sealant (not shown) is formed at an edge of the substrates to prevent liquid crystal from leaking out.

The column spacer 126 is formed on the upper substrate 118 at a position corresponding to a predetermined portion of the gate line 114 through photolithography that optically or chemically removes an unnecessary portion of an insulating material to create a predetermined pattern.

A protrusion (not shown) is formed on the gate line 114 contacting the column spacer 126. The protrusion prevents an overcharge of liquid crystal and minimizes a flow amount of liquid crystal to improve an image quality.

The alignment degree of the upper and lower substrates 118 and 119 is determined by a margin given at the design of the two substrates and generally requires an accuracy of about several micrometers.

When the alignment of the two substrates 118 and 119 deviates from the given margin, light leakage occurs which causes an undesirable operational characteristic.

As the LCD has become more highly integrated, spacing between the elements thereof is much narrower.

Accordingly, even a slightly-inaccurate alignment of the substrates causes a corresponding element to locate at an incorrect position, resulting in degradation in color reproductivity and product yield. Therefore, the accuracy in the alignment of the substrates becomes more important.

However, in the above LCD, the alignment margin between the substrates leads to degradation in the alignment accuracy and a long time required for forming the color filter and the TFT on the different substrates causes degradation in a manufacturing yield. Accordingly, there is proposed a color on TFT (COT) type LCD or a TFT on color filter (TOC) type LCD in which a color filter and a TFT are formed on the same substrate.

However, since a color filter and overcoat layer are stacked on a TFT substrate in the COT type LCD and the resulting structure is planarized, the abovementioned protrusion does not protrude from the substrate and thus cannot perform its function.

This structure leads to an easy flow of liquid crystal between the two substrates, resulting in the non-uniformity of a cell gap and the degradation of an image quality. Also, when the liquid crystal panel is rubbed, the liquid crystal is non-uniformly distributed, resulting in the non-uniformity of black brightness.

SUMMARY OF THE INVENTION

Accordingly, the present invention is directed to an LCD and a manufacturing method thereof that substantially obviates one or more problems due to limitations and disadvantages of the related art.

An advantage of the present invention is to provide an LCD and a manufacturing method thereof, in which a cell gap is constantly maintained and an overcharge of liquid crystal is prevented. Thus, a uniform black brightness and an improved image quality are obtained. In the LCD, a color filter layer and an array device including a TFT are formed on a first substrate, a column spacer is formed on the color filter layer and a protrusion is formed on a second substrate facing the first substrate.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD including: a first substrate including a TFT and a color filter layer; a second substrate facing the first substrate; a column spacer on the first substrate; a protrusion on the second substrate at a position corresponding to the column spacer; and a liquid crystal layer formed between the first and second substrates.

In another aspect of the present invention, there is provided a method for manufacturing an LCD, including: providing first and second substrates; forming a TFT and a color filter layer on the first substrate; forming a column spacer on the first substrate; forming a protrusion on the second substrate at a position corresponding to the column spacer; attaching the first and second substrates together; and providing a liquid crystal between the first and second substrates.

In another aspect of the present invention, there is provided a method for manufacturing an LCD, including: providing first and second substrates that face each other; forming a gate electrode and a gate line on a first substrate; forming a gate insulating layer on a region covering the gate electrode and the gate line; sequentially forming an active layer and an ohmic contact layer on the gate electrode; forming source and drain electrodes on the ohmic contact layer, wherein the gate, source and drain electrodes form a TFT; forming a passivation layer on the TFT; forming a black matrix on the passivation layer to cover the gate line and the TFT, the black matrix including an opening portion at a sub-pixel region; forming a first transparent conductive layer on a region covering the black matrix; forming a color filter layer at the opening portion of the black matrix in each sub-pixel; and forming a second transparent conductive layer on an upper region including the color filter layer; and simultaneously patterning the first and second transparent conductive layers on a sub-pixel basis to form a pixel electrode including a first pixel electrode and a second pixel electrode by.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 3:
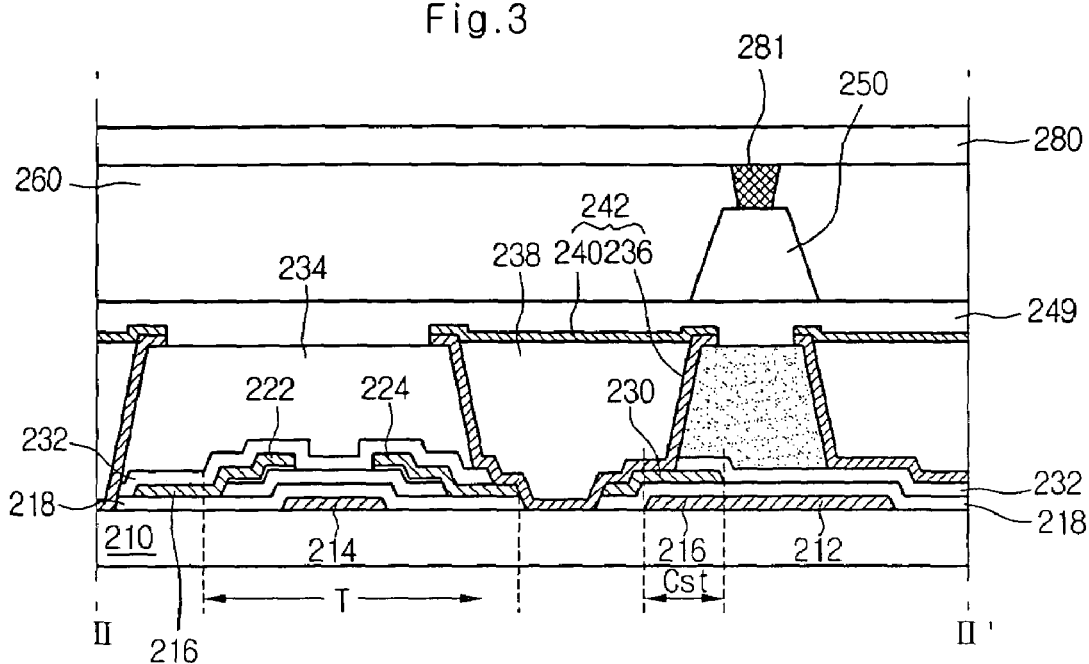
FIG. 3 is a sectional view of an LCD according to an embodiment of the present invention, illustrating a pixel region including a TFT and a gate line region having a column spacer formed thereon.

FIG. 3 is a sectional view of an LCD according to an embodiment of the present invention, which illustrates a pixel region including a TFT and a gate line region having a column spacer formed thereon.

Figure 1:
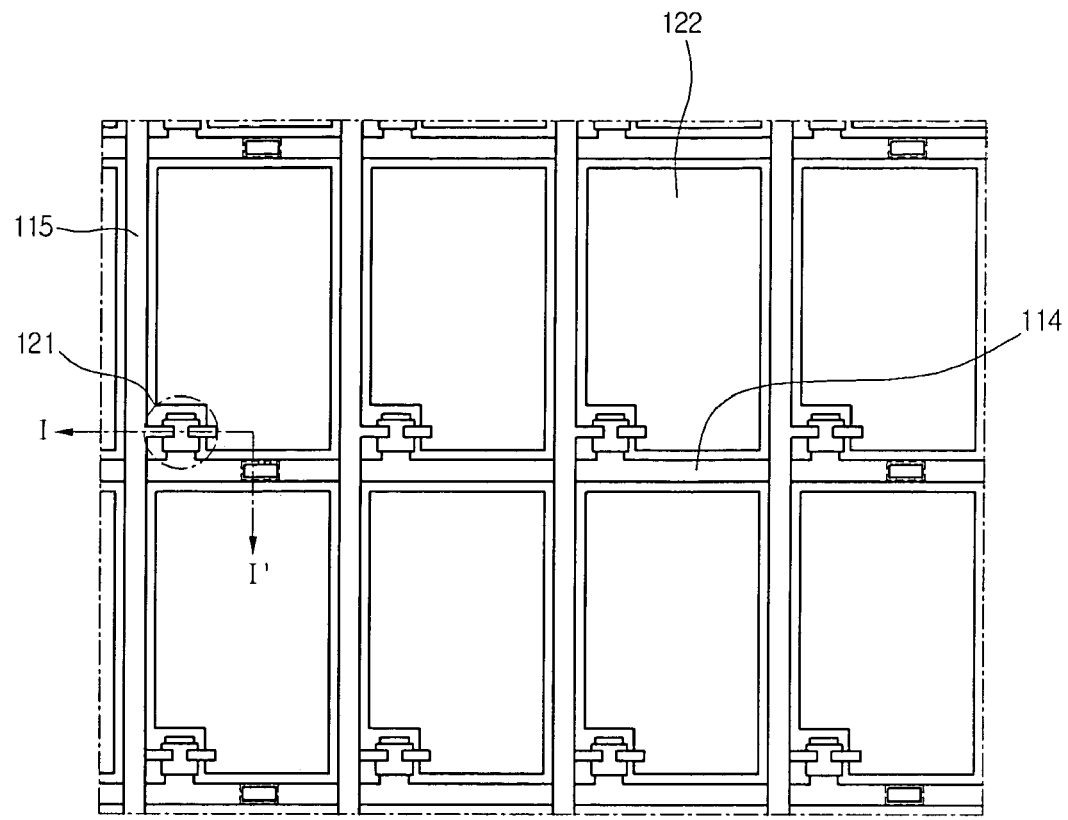
FIG. 1 is a plan view of a lower substrate of a related art LCD.
Figure 2:
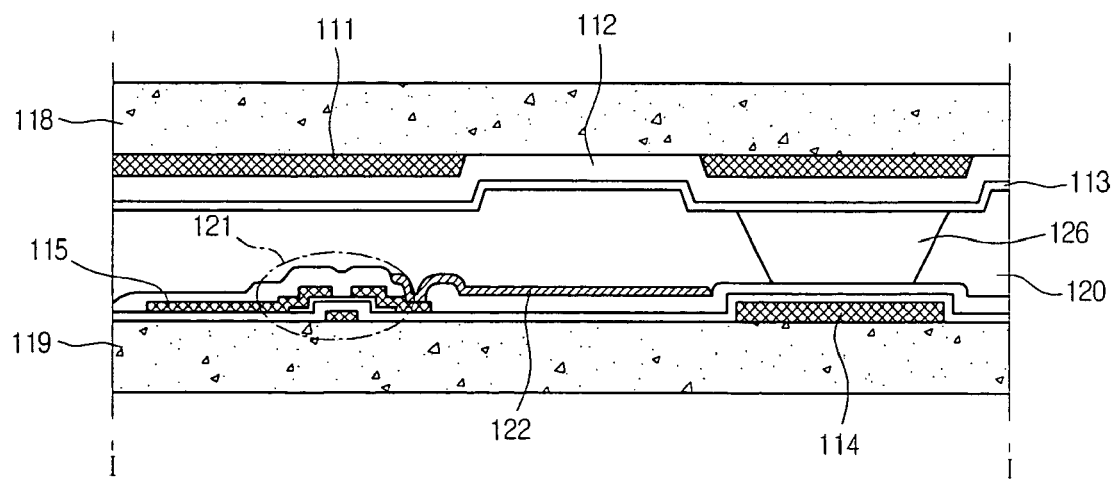
FIG. 2 is an enlarged sectional view taken along line I-I' in FIG. 1.

Here, this sectional view, line II-II' corresponds to the sectional view line I-I' shown in FIG. 2.

Also, the LCD according the present invention has a COT structure in which a color filter is formed on an array substrate on which a TFT is formed. This structure can solve a problem in attaching upper and lower substrates and can improve brightness by preventing light penetrating common and pixel electrodes from being absorbed by the color filter.

In addition, the present invention can also be applied to a TOC LCD.

In FIG. 3, a COT LCD according to the present invention includes an upper substrate 280, a lower substrate 210 on which a thin film transistor (switching device) T for converting an arrangement of liquid crystal molecules is formed, and a liquid crystal layer 260 formed between the upper and lower substrates 280 and 210. Here, a color filter 238 and a black matrix 234 are formed on the lower substrate 210, not on the upper substrate 280.

The lower substrate 210 further includes gate and data lines 212 and 226 perpendicularly crossing each other to define a pixel region, and a pixel electrode 242 for receiving a signal from the TFT T to apply a voltage to the liquid crystal layer 260.

The TFT T includes a gate electrode 214 branching from the gate line 212, a source electrode 222 branching from the data line 226, and a drain electrode 224 spaced apart from the source electrode 222 by a predetermined distance.

The pixel electrode 242 includes a first pixel electrode 236 and a second pixel electrode 240 which overlap a front end of the gate line 212. The gate line 212 overlapping the pixel electrode 242 includes a first capacitor electrode 216.

A second capacitor electrode 230 made of the same material as the data line 226 is formed on the first capacitor electrode 216.

The second capacitor electrode 230 is electrically connected to the first pixel electrode 236. A storage capacitor CST is formed in a region where the first and second capacitor electrodes 216 and 230 and the pixel electrode 242 overlap each another.

The black matrix 234 is formed to cover the gate line 212, the data line 226 and the TFT T.

The pixel electrode 242 is connected directly to sides of the drain electrode 224 and the second capacitor electrode 230 without using a separate contact hole.

The color filter 238 is formed between the first and second pixel electrodes 236 and 240.

An overcoat layer 249 for planarizing the lower substrate 210 is formed on the lower substrate 210 on which the pixel electrode 242 has been formed.

A column spacer 250 is formed on the overcoat layer 249 to maintain a constant gap between the lower substrate 210 and the upper substrate 280, and a sealant (not shown) is formed at an edge of the substrates to prevent liquid crystal from leaking out.

The column spacer 250 is formed on the gate line 212 through photolithography that optically or chemically removes an unnecessary portion by an insulating material to create a predetermined pattern.

Meanwhile, a protrusion 281 is formed on the upper substrate 280 at a position corresponding to the column spacer 250.

Here, the protrusion 281 prevents an overcharge of liquid crystal and minimizes a flow amount of liquid crystal to improve an image quality.

Hereinafter, a manufacturing process for the COT LCD will be described with reference to FIGS. 3 and 4A to 4H.

FIGS. 4A to 4H are sectional views illustrating a manufacturing process for a COT LCD according to the present invention.

Figure 4A:
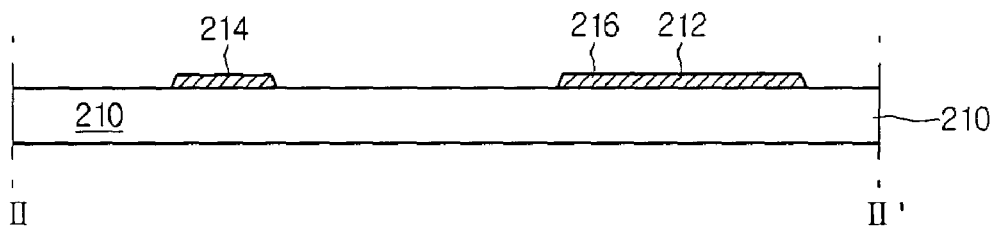
FIGS. 4A to 4H are sectional views illustrating a manufacturing process for an LCD according to an embodiment of the present invention.

Referring first to FIG. 4A, a first metal material is deposited on a lower substrate 210 and then a gate electrode 214, a first capacitor 216 and a gate line 212 are formed on the lower substrate 210 through photolighography using a photosensitive material.

Here, the gate electrode 214 is a pattern branching from a front end of the gate line 212.

Figure 4B:
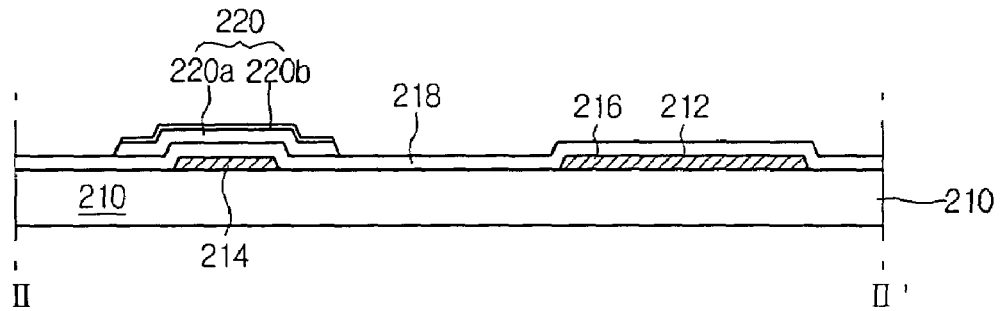

In FIG. 4B, a first insulating material, an amorphous silicon material, and a doped amorphous silicon material are sequentially deposited on a region covering the gate electrode 214, the first capacitor 216, and the gate line 212.

Next, a gate insulating layer 218 is formed of the first insulating material, and an active layer 220a and an ohmic contact layer 220b are sequentially formed respectively of the amorphous silicon material and the doped amorphous silicon material on the gate insulating layer 218 at a position corresponding to the gate electrode 214 through photolithography.

The active layer 220a and the ohmic contact layer 220b constitute a semiconductor layer 220.

Figure 4C:
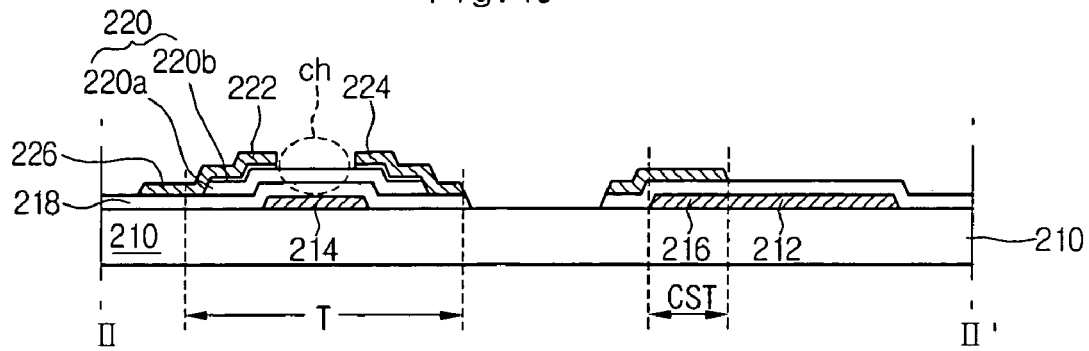

In FIG. 4C, a second metal material is deposited to cover the semiconductor layer 220.

Thereafter, through photolithography, a source electrode 222 and a drain electrode 224 are formed on the semiconductor layer 220 in such a way to be spaced apart from each other by a predetermined distance. The source electrode 222 is formed to extend from the data line 226.

Here, the gate electrode 214, the semiconductor layer 220, the source electrode 222, and the drain electrode 224 constitute a TFT T.

At this time, the ohmic contact layer 220b disposed between the source electrode 222 and the drain electrode 224 is removed to expose a portion of the active layer 220a. Here, the exposed portion serves as a channel ch.

The channel ch is formed using an etching process without a separate mask, that is, using the source and drain electrodes 222 and 224 as a mask.

Figure 4D:
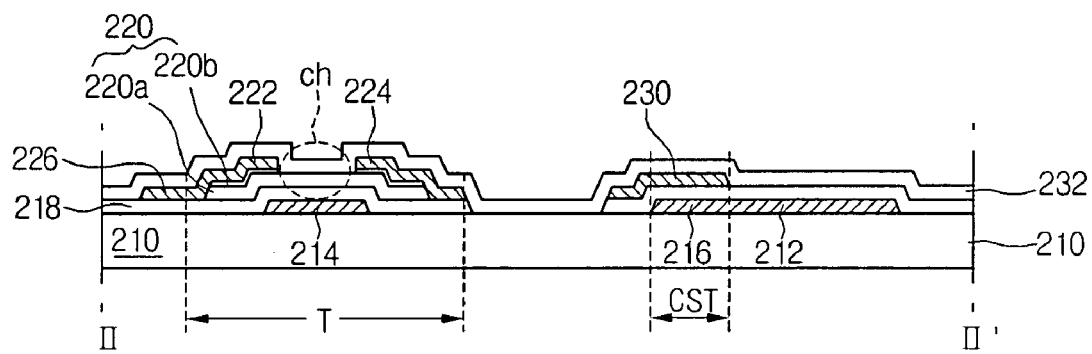

In FIG. 4D, a passivation layer 232 is formed of a second insulating layer on a region covering the source electrode 222, the drain electrode 224, the data line 226, and the second capacitor electrode 230.

The passivation layer 232 prevents a possible defective contact between a black matrix (234 in FIG. 4E) and the TFT. Here, the passivation layer 232 is made of an inorganic insulating material, for example, silicon nitride (SiNx).

The gate insulating layer 218 and the passivation layer 232 are sequentially stacked also on the gate line 212.

Figure 4E:
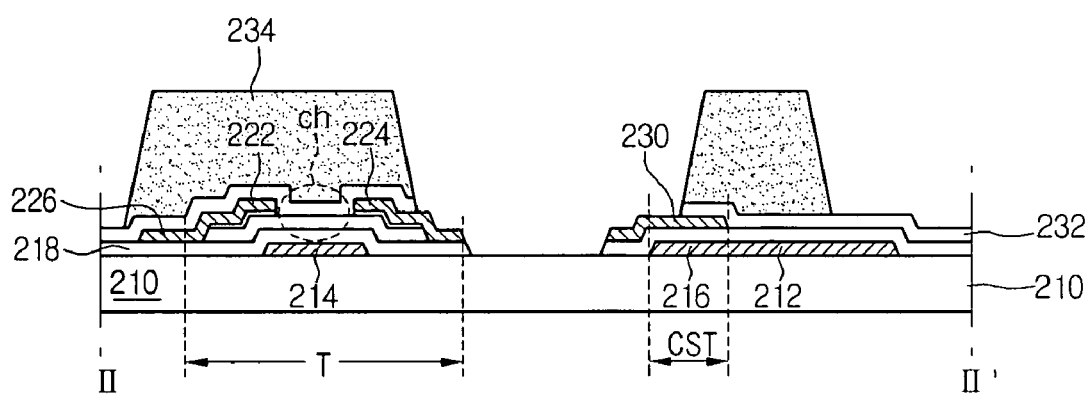

In FIG. 4E, a light shielding material is formed on the passivation layer 232. Thereafter, through a third mask process, a black matrix 234 is formed to cover the gate line 212, the data line 226, and the TFT T. The black matrix 234 has an opening portion at a sub-pixel region P.

The black matrix 234 is made, for example, of an opaque inorganic material. The black matrix 234 blocks light and protects the TFT.

The black matrix is also formed on the passivation layer 232 on the gate line 212.

The passivation layer formed in the opening region is removed so that portions of the drain electrode 214 and the second capacitor electrode 230 are exposed through the opening portion.

That is, by using the black matrix 234 and the exposed patterns of the electrodes 224 and 230 as a mask, an exposed passivation layer 232 and the gate insulating layer 218 are simultaneously etched and portions of the drain electrode 224 and the second capacitor electrode 230 are exposed.

Figure 4F:
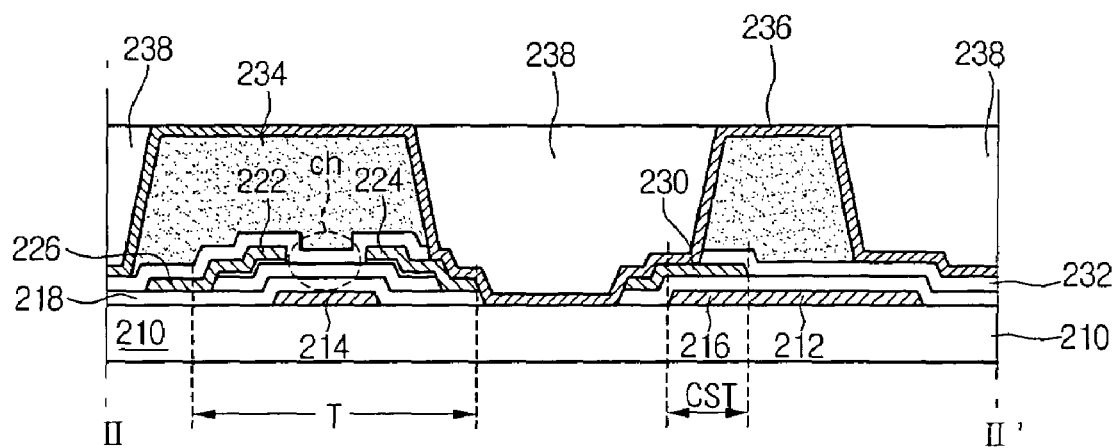

In FIG. 4F, a first transparent conductive layer 236 is formed of a first transparent conductive material on a region covering the black matrix 234. The first transparent conductive layer 236 prevents a liquid agent used for patterning a color filter 238 from penetrating the gate insulating layer 218 to damage the gate line 212 and the gate electrode 214.

The first transparent conductive layer 236 is directly connected to the exposed portions of the drain electrode 224 and the second capacitor electrode 230 and is formed at a region including a side stepped portion of the black matrix 234.

The color filter 238 is formed at the opening portion of the black matrix 234 in each sub-pixel.

Figure 4G:
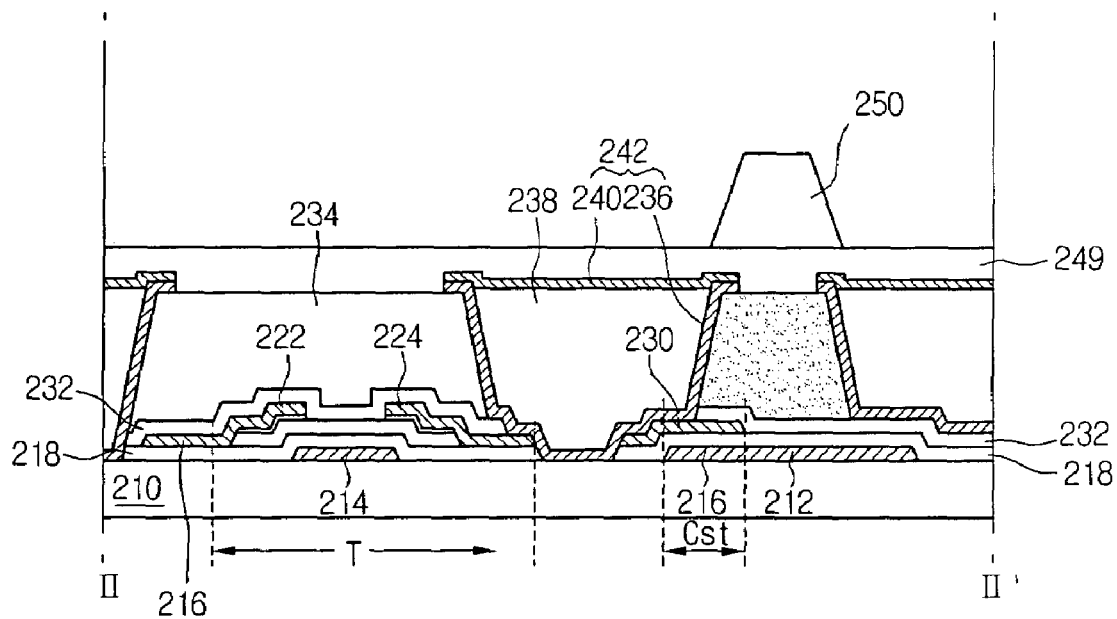

In FIG. 4G, a second transparent conductive layer is formed of a second transparent conductive material on the color filter layer 238. Thereafter, through a mask process, the first and second transparent conductive layers are simultaneously patterned on a sub-pixel basis to form a pixel electrode 242 including a first pixel electrode 236 and a second pixel electrode 240.

An overcoat layer 249 for planarizing the substrate 210 is formed on an entire surface of the substrate 210 on which the pixel electrode has been formed, and a column spacer 250 is formed on the overcoat layer 249 on the gate line 212 through photolithography.

Here, the column spacer 250 is formed on the gate line 212 through photolithography that optically or chemically removes an unnecessary portion by an insulating material to create a predetermined pattern.

Figure 4H:
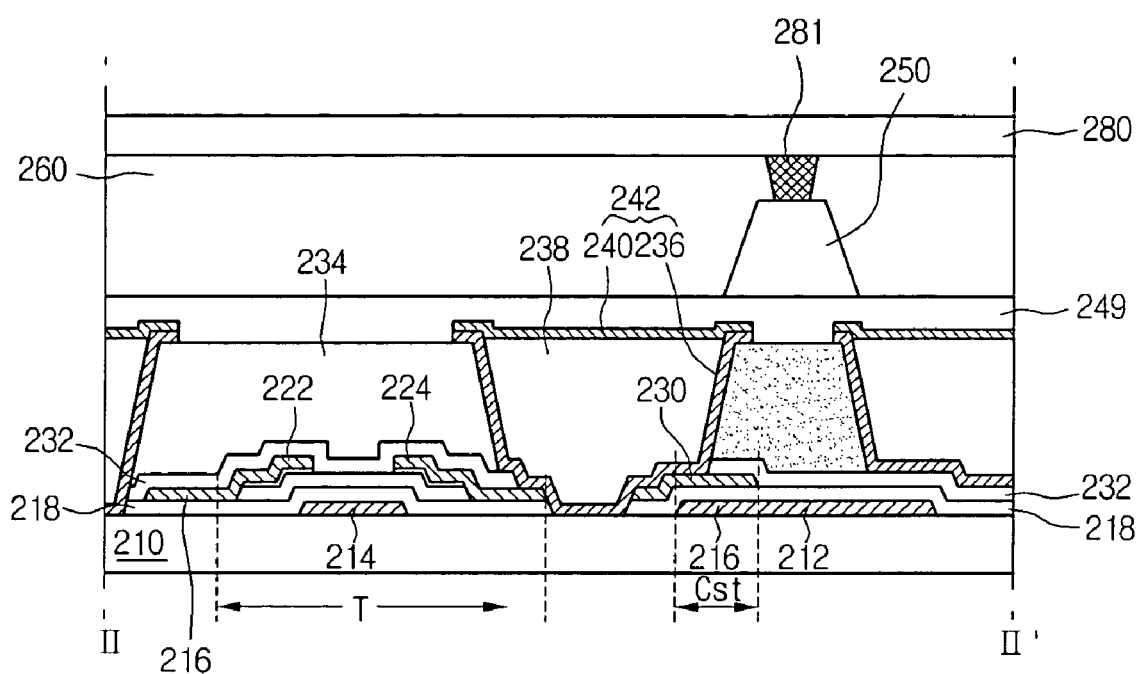

In to FIG. 4H, a protrusion 281 is formed on an upper substrate 280 facing the lower substrate 210 at a position corresponding to the column spacer 250. Thereafter, the lower and upper substrates 210 and 280 are attached together. Finally, liquid crystal 260 is charged between the lower and upper substrates 210 and 280.

Here, the protrusion 281 prevents an overcharge of the liquid crystal and minimizes a flow amount of the liquid crystal to improve an image quality.

When a column spacer is formed on a first substrate on which an array device and a color filter are formed and a protrusion is formed on a second substrate facing the first substrate in a COT or TOC type LCD as mentioned above, the thickness of a liquid crystal cell can be freely formed irrespective of a characteristic of a TFT and a uniform cell gap can be obtained.

At this time, the protrusion 281 is formed to have a smaller size than the column spacer 250, thereby reducing a contact area therebetween.

As described above, in the COT or TOC type LCD where the array device including the TFT and the color filter layer are formed on one substrate, the column spacer is formed on the color filter layer and then the protrusion is formed on the opposite substrate. Accordingly, a cell gap is constantly maintained and an overcharge of liquid crystal is prevented, thereby providing a uniform black brightness and an improved image quality.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An LCD comprising:
    a first substrate including a TFT and a color filter layer having a color filter;
    a second substrate facing the first substrate;
    a column spacer on the first substrate;
    a protrusion on the second substrate at a position corresponding to the column spacer; and
    a liquid crystal layer between the first and second substrates,
    wherein a pixel electrode comprise a first pixel electrode and a second pixel electrode, and the color filter is formed in a region between the first pixel electrode and the second pixel electrode, and
    wherein the first pixel electrode is arranged beneath the color filter and the second pixel electrode is arranged on the color filter.

2. The LCD according to claim 1, wherein the TFT includes:
    a gate electrode on the first substrate;
    a gate insulating layer on an entire surface of the first substrate and covering the gate electrode;
    a semiconductor layer on the gate insulating layer; and
    source and drain electrodes on the semiconductor layer.

3. The LCD according to claim 2, wherein the gate electrode is extended from a gate line.

4. The LCD according to claim 3, wherein a portion of the gate line is a first capacitor electrode, and a second capacitor electrode made of a same material as a data line overlaps a predetermined portion of the first capacitor electrode.

5. The LCD according to claim 4, wherein the second capacitor electrode is electrically connected to a first pixel electrode.

6. The LCD according to claim 1, wherein the color filter layer comprises:
    black matrixes on the first substrate;
    the color filter between the black matrixes; and
    the second pixel electrode formed on the color filter.

7. The LCD according to claim 1, wherein the protrusion is formed to have a smaller size than the column spacer.

8. The LCD according to claim 6, wherein the column spacer is formed on the black matrix.

9. The LCD according to claim 1, further comprising an overcoat layer formed on the first substrate,
    wherein the overcoat layer is placed on the second pixel electrode.

10. The LCD according to claim 1, wherein the first pixel electrode is directly connected to a side of a drain electrode of the TFT without a separate contact hole therebetween.

* * * * *